(12) United States Patent
Huang

(10) Patent No.: US 9,162,613 B2
(45) Date of Patent: *Oct. 20, 2015

(54) VEHICLE REAR LIGHT ASSEMBLY

(76) Inventor: Yao Hung Huang, Tainan County (TW)

( * ) Notice: Subject to any disclaimer, the term of this patent is extended or adjusted under 35 U.S.C. 154(b) by 161 days.

This patent is subject to a terminal disclaimer.

(21) Appl. No.: 13/597,670

(22) Filed: Aug. 29, 2012

(65) Prior Publication Data

US 2014/0062689 A1     Mar. 6, 2014

(51) Int. Cl.
*B60Q 1/50*     (2006.01)
*B60Q 1/26*     (2006.01)

(52) U.S. Cl.
CPC ............ *B60Q 1/2607* (2013.01); *B60Q 1/2696* (2013.01)

(58) Field of Classification Search
CPC ............... B60Q 1/34; B60Q 1/44; B60Q 1/50
USPC .................... 340/439, 464, 465, 467, 468
See application file for complete search history.

(56) References Cited

U.S. PATENT DOCUMENTS

| | | | | |
|---|---|---|---|---|
| 1,513,300 A * | 10/1924 | Vose | ............................... | 362/497 |
| 1,526,868 A * | 2/1925 | Petrovich | ...................... | 362/497 |
| 1,567,193 A * | 12/1925 | Ritz-Woller | .................. | 362/497 |
| 1,887,087 A * | 11/1932 | Frizner | ........................... | 40/209 |
| 4,631,516 A * | 12/1986 | Clinker | .......................... | 340/464 |
| 4,808,968 A * | 2/1989 | Caine | ............................. | 340/479 |
| 4,845,481 A * | 7/1989 | Havel | ............................... | 345/46 |
| 4,868,719 A * | 9/1989 | Kouchi et al. | .................. | 362/545 |
| 4,928,084 A * | 5/1990 | Reiser | ........................... | 340/479 |
| 5,001,398 A * | 3/1991 | Dunn | ............................... | 315/77 |
| 5,150,959 A * | 9/1992 | Paffrath et al. | ................ | 362/548 |
| 5,184,114 A * | 2/1993 | Brown | ............................ | 345/83 |
| 5,396,229 A * | 3/1995 | Miyauchi | ...................... | 340/7.55 |
| 5,463,370 A * | 10/1995 | Ishikawa et al. | ............... | 340/439 |
| 5,567,036 A * | 10/1996 | Theobald et al. | ............. | 362/485 |
| 5,567,038 A * | 10/1996 | Lary | ............................. | 362/106 |
| 5,612,711 A * | 3/1997 | Rose | ................................ | 345/59 |
| 5,644,290 A * | 7/1997 | Rhodes | .......................... | 340/468 |
| 5,663,707 A * | 9/1997 | Bartilucci | ...................... | 340/464 |
| 5,769,524 A * | 6/1998 | Yuan | ............................. | 362/487 |
| 5,896,084 A * | 4/1999 | Weiss et al. | .................... | 340/468 |
| 5,955,945 A * | 9/1999 | Fuhrer | .......................... | 340/479 |
| 6,095,663 A * | 8/2000 | Pond et al. | ..................... | 362/247 |
| 6,533,445 B1 | 3/2003 | Rogers | | |
| 6,639,574 B2 * | 10/2003 | Scheibe | .......................... | 345/83 |
| 7,033,036 B2 * | 4/2006 | Pederson | ........................ | 362/35 |
| 7,046,160 B2 * | 5/2006 | Pederson et al. | .......... | 340/815.45 |
| 7,075,423 B2 * | 7/2006 | Currie | .......................... | 340/467 |
| 7,144,324 B2 * | 12/2006 | Yarbrough et al. | ............. | 463/46 |
| 8,193,734 B2 * | 6/2012 | Chen et al. | .................... | 315/294 |
| 8,441,194 B2 * | 5/2013 | Huang | ............................. | 315/80 |
| 8,569,953 B2 * | 10/2013 | Huang | ............................. | 315/80 |
| 2006/0284190 A1* | 12/2006 | Zimmerman et al. | .......... | 257/79 |
| 2008/0164823 A1* | 7/2008 | Huang et al. | .................. | 315/150 |

(Continued)

*Primary Examiner* — George Bugg
*Assistant Examiner* — Paul Obiniyi
(74) *Attorney, Agent, or Firm* — Albert O. Cota

(57) ABSTRACT

A vehicle rear light assembly (VRLA) that is enclosed within an elongated LED display unit that includes a center compartment having a plurality of red LEDs and contiguous left and right compartments each having a plurality of yellow/red LEDs. The VRLA is comprised of an electrical circuit consisting of a function select circuit that is connected to a vehicle and sequentially includes an LED drive circuit, an LED control circuit and a LED activation circuit that is connected, in combination with the LED drive circuit, to the LED display unit. The display unit allows the viewing of left and right blinking turn signals, brake lights and tail lights.

9 Claims, 2 Drawing Sheets

(56) References Cited

U.S. PATENT DOCUMENTS

| | | | |
|---|---|---|---|
| 2009/0161038 A1* | 6/2009 | Toyama et al. | 349/62 |
| 2010/0053046 A1* | 3/2010 | Nakanishi | 345/82 |
| 2010/0102752 A1* | 4/2010 | Chen et al. | 315/294 |
| 2010/0135006 A1* | 6/2010 | Huang | 362/185 |
| 2011/0013385 A1* | 1/2011 | Chien | 362/183 |
| 2011/0084292 A1* | 4/2011 | McDaniel, Jr. | 257/89 |
| 2012/0095646 A1* | 4/2012 | Ghazarian | 701/36 |
| 2012/0140144 A1* | 6/2012 | Yamashita et al. | 349/62 |
| 2012/0194072 A1* | 8/2012 | Huang | 315/77 |
| 2012/0217046 A1* | 8/2012 | Hu et al. | 174/255 |
| 2012/0229027 A1* | 9/2012 | Huang | 315/80 |
| 2012/0242479 A1* | 9/2012 | Ghazarian et al. | 340/465 |

\* cited by examiner

VEHICLE REAR LIGHT ASSEMBLY

TECHNICAL FIELD

The invention generally pertains to vehicle light assemblies, and more particularly to a vehicle rear light assembly (VRLA). The VRLA is contained within a rear-viewed LED display unit that utilizes a combination of LEDs to produce a right and left turn signal, a tail light signal and a brake light signal.

BACKGROUND ART

Currently available vehicle light assemblies utilize LEDs to illuminate rear facing lights such as right and left turn lights, a tail lights and a brake lights. The LEDs are selected to provide a particular color such as a yellow light for right and left signals or a red light for tail lights and brake lights. LEDs have a longer useful life, conserve energy and are friendly to the environment. Also, by using colored LEDs, the necessity to have colored lenses is not required because the individual LEDs provide the required colors, namely yellow or red.

The inventive vehicle rear light assembly (VRLA) functions in combination with the rear facing lights located on a typical vehicle. The VRLA utilizes an LED display unit that faces rearward when mounted on the rear window of a vehicle. The VRLA enhances the light viewing area and increases the safety factor of the vehicle.

A search of the prior art did not disclose literature or patents that read directly on the claims of the instant invention. However, the following U.S. patents are considered related.

| Pat. No. | INVENTOR | ISSUED |
| --- | --- | --- |
| 6,533,455 | Rogers | 18 Mar. 2003 |
| 5,896,084 | Weiss et al | 20 Apr. 1999 |
| 5,663,707 | Bartilucci | 2 Sep. 1997 |
| 5,567,036 | Theobald et al | 22 Oct. 1996 |

The U.S. Pat. No. 6,533,445 discloses a unitary multiple light assembly for motor vehicle trailers. The assembly uses different arrays of LEDs to illuminate a side marker light, a rear tail or brake light, and a license plate light. A license plate attaching bracket holds the license plate in a location in which individual LEDs in a light fixture can shine directly on the license plate.

The U.S. Pat. No. 5,896,084 discloses a tail light assembly for a motor vehicle. The assembly includes a rear light, a brake light, and a turn signal light, wherein the lights are comprised of LEDs. The assembly also includes a control device for operating the LEDs at a constant current for a given voltage range.

The U.S. Pat. No. 5,663,707 discloses a signaling light that is visible through a rear window of a vehicle. The light includes a primary electrically energizable signaling light unit having a first array of green LEDs, a second array of red LEDs, and a third array of yellow LEDs. A pair of secondary electrically energizable signaling light units including a fourth array of red LEDs are positioned at a left extent of the rear window and a fifth array of LEDs are positioned at a right extent of the rear window.

The U.S. Pat. No. 5,567,036 discloses a side marker lamp that is used for truck/trailer combinations. The lamp utilizes LEDs that are mounted to a plurality of circuit boards. The circuit boards are mounted at predetermined angles relative to each other for directing light in at least three directions. A lens is placed in front of the LEDs and includes a series of prism optics for spreading the light emitted from the LEDs into an arc of up to 180 degrees.

For background purposes and as indicative of the art to which the invention relates, reference may be made to the following remaining patents found in the search.

| Pat. No. | INVENTOR | ISSUED |
| --- | --- | --- |
| 6,095,663 | Pond et al | 1 Aug. 2000 |
| 5,644,290 | Rhodes | 1 Jul. 1997 |
| 5,463,370 | Ishikawa et al | 31 Oct. 1995 |
| 5,150,959 | Paffrath et al | 29 Sep. 1992 |
| 5,001,398 | Dunn | 19 Mar. 1991 |
| 4,631,516 | Clinker | 23 Dec. 1986 |
| 1,887,087 | Frizner | 8 Nov. 1932 |
| 1,567,193 | Ritz-Woller | 29 Dec. 1925 |
| 1,526,868 | Petrovich | 17 Feb. 1925 |
| 1,513,300 | Vose | 28 Oct. 1924 |

DISCLOSURE OF THE INVENTION

The vehicle rear light assembly (VRLA) is designed to allow the viewing of a vehicle's left and right turn signals, the tail lights and the brake lights in a convenient and easily viewed assembly that is attached to the rear window of a vehicle.

The VRLA functions in combination with a vehicle that includes a left turn switch that produces a left turn input signal, a right turn switch that produces a right turn input signal, a brake pedal that produces a brake input signal, and a tail light switch that produces a tail light input signal.

The basic design configuration of the VRLA is comprised of:
  A. A function select circuit having means for receiving and processing a selected vehicle input signal and producing an output consisting of a function select signal,
  B. An LED drive circuit having means for receiving and processing the function select signal and producing an output consisting of an LED drive signal,
  C. An LED control circuit having means for receiving and processing a selected vehicle input signal and producing an output consisting of a transistor activation signal,
  D. An LED activation circuit having means for receiving and processing the transistor activation signal and producing an LED activation signal, and
  E. An LED display unit having a plurality of LEDs that correspond to the selected vehicle input signal, wherein the LEDs are selectively illuminated when said LED display unit is applied the LED drive signal from said. LED drive circuit and the LED activation signal from said LED activation circuit.

The LED display unit is preferably comprised of a hermetically sealed unit that includes a rear section having a reflective inner surface that enhances the brightness of the LEDs. The center compartment of the LED display unit is comprised of 9 red LEDs. Likewise, a left and a right compartment are comprised of 3 yellow/red LEDs. The LEDs are electrically connected in a series-parallel configuration.

The LED display unit includes a structure for attaching the unit to the inner surface of the vehicle's rear window. The structure allows the LEDs in the LED display unit to be easily viewed from the rear of the vehicle.

In view of the above disclosure, the primary object of the invention is to provide an LED display unit that is clearly visible and that alerts a following vehicle that a left turn, right turn, brake signal or tail light has been activated. The hazard light remains as originally wired in the vehicle.

In addition to the primary object of the invention it is also an object of the invention provide the VRLA that:
  adds aesthetics to a vehicle,
  can be produced in various colors,
  can be made of various materials,
  increases safety,
  is easy to install,
  can be an OEM product or an after-market product,
  is durable, and
  is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
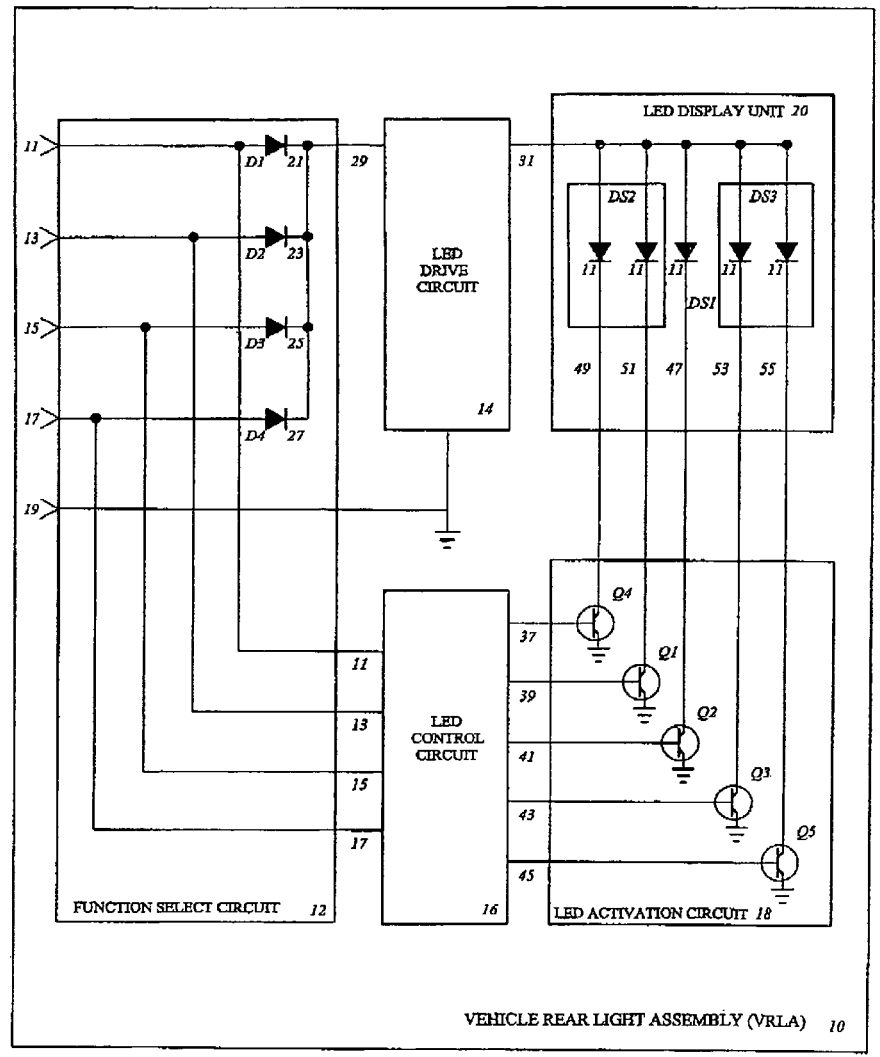
FIG. 1 is a block diagram of the vehicle rear light assembly (VRLA).
Figure 2:
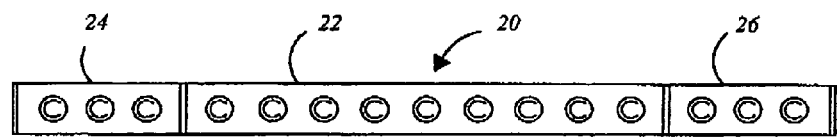
FIG. 2 is a front elevational view of the LED display unit.
Figure 3:
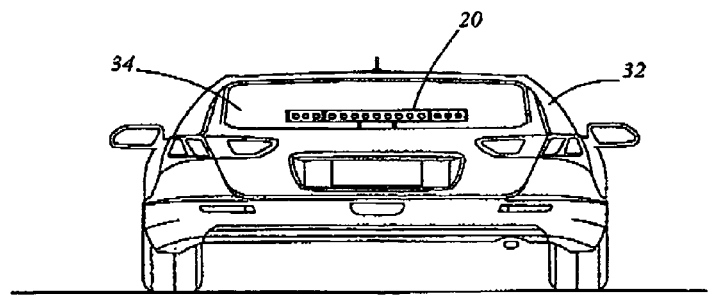
FIG. 3 is a front elevational view of the LED display unit attached to the rear window of a vehicle and shown with the right turn signal illuminated.

The best mode for carrying out the invention is presented in terms that disclose a preferred embodiment of a vehicle rear light assembly (VRLA). The VRLA 10, as shown in FIGS. 1-3, is comprised of the following major elements: a function select circuit 12, an LED drive circuit 14, an LED control circuit 16, an LED activation circuit 18 and an LED display unit 20. The VRLA 10 functions in combination with a vehicle 32 having a rear window 34, a left turn switch that produces a left turn input signal 11, a right turn switch that produces a right turn input signal 13, a brake pedal that produces a brake input signal 15, and a tail light switch that produces a tail light input signal 17. The vehicle 32 also provides a circuit ground 19 that is connected to the VRLA 10.

The vehicle function select circuit 12, as shown inn FIG. 1, has means for receiving and processing the left turn input signal 11 and producing through an isolation diode D1, a left turn output signal 21, the right turn input signal 13 and producing through an isolation diode D2 a right turn output signal 23, the brake input signal 15 and producing through an isolation diode D3 a brake output signal 25, and the tail light input signal 17 and producing through an isolation diode D4 a tail light output signal 27. The isolation diodes D1, D2, D3 and D4 prevent voltage present on any single output signal 21, 23, 25, 27 from traveling back through any of the other electrical connections which may or may not be active.

The vehicle function select circuit 12 produces a single output consisting of a function select signal 29 that corresponds to the particular vehicle function that has been selected by the driver of the vehicle 32. The signal 29, as shown in FIG. 1, is applied to the LED drive circuit 14. When any one of the input signals 11, 13, 15 and 17 is activated by the vehicle driver, 12-volts d-c is applied to the function select circuit 12, thereby causing the VRLA 10 to become active.

The inputs signals 11, 13, 15 and 17 are also connected to the LED control circuit 16, as shown in FIG. 1.

The LED drive circuit 14, as shown in FIG. 1, is designed to receive and process the function select signal 29 and to produce an output consisting of an LED drive signal 31. The circuit 14 can be comprised of a GL2596 voltage regulator or equivalent. The regulator lowers the 12-volt d-c voltage present at the LED drive signal 31 to 1.5 volts d-c to power the LEDs located on the LED display unit 20.

The LED control circuit 16, as shown in FIG. 1, has means for receiving and processing the left turn input signal 11, the right turn input signal 13, the brake input signal 15 and the tail light input signal 17. The circuit 16 utilizes a microcontroller, in combination with firmware, to determine which LEDs are to be activated and how bright the LEDs will illuminate. The output of the circuit 16 is a transistor activation signal 37, a transistor activation signal 39, a transistor activation signal 41, a transistor activation signal 43 and a transistor activation signal 45, which are all applied to the LED activation circuit 18.

The LED activation circuit 18, as shown in FIG. 1, is comprised of a transistor Q1 having a collector connected via an LED activation signal 51 to the cathode of LED DS2, a base connected to the transistor activation signal 39 and an emitter connected to circuit ground, a transistor Q2 having a collector connected via. LED activation signal 47 to the cathode of LED DS1, a base connected to the transistor activation signal 41 and an emitter connected to circuit ground, a transistor Q3 having a collector connected via LED activation signal 53 to the cathode of LED DS3, a base connected to the transistor activation signal 43 and an emitter connected to circuit ground, a transistor Q4 having a collector connected via LED activation signal 48 to the cathode of LED DS2, a base connected to the transistor activation signal 37 and an emitter connected to circuit ground, and a transistor Q5 having a collector connected via LED activation signal 55 to the cathode of LED DS3, a base connected to the transistor activation signal 45 and an emitter connected to circuit ground 19. The signals from the LED activation circuit 18 are connected to the LED cathodes located on the LED display unit 20.

The LED display unit 20, as shown in FIGS. 1, 2 and 3, is comprised a hermetically sealed enclosure that includes of an integrated center compartment 22, a left compartment 24 and a right compartment 26. The center compartment 22 has a plurality of LEDs designated by the reference DS1, wherein each LED produces a red light. The left compartment 24 has a plurality of LEDs designated by the reference DS2, wherein each LED selectively produces within a single enclosure a red light or a yellow light. The right compartment 26 also has a plurality of LEDs designated by the reference DS3, wherein each LED selectively produces within a single enclosure a red light or a yellow light.

The plurality of LEDs located in the center compartment 22 of the LED display unit 20 ranges from 7 to 11 LEDs, with 9 LEDs preferred. The plurality of LEDs located on the left compartment 24 and the right compartment 26 of the LED display unit 20 ranges from 2 to 5 LEDs, with 3 LEDs preferred. The plurality of LEDs are electrically connected in a series-parallel configuration. The LED display unit 20 can be designed to have a rear section having a reflective inner surface that enhances the light viewing area. The LED display unit 20 also has a structure for being attached to the rear window 34 of a vehicle 32 to allow the LED display unit 20 to be viewed from the rear of the vehicle, as shown in FIG. 3.

Operation

The operation flow path of the VRLA 10, as shown in FIG. 1, is presented by describing the flow path of the tail light input signal 17 which is activated when the driver of the vehicle 32 activates the vehicle light switch, and the brake input signal 15 which is activated when the vehicle brake pedal is pressed. The remaining signals 11 and 13 follow the same flow path and therefore are not described.

When the tail light input signal 17 is activated, 12-volts d-c is applied through the isolation diode D4 to the tail light output signal 27 and subsequently to the function select signal 29. The signal 29 is connected to the input of the LED drive circuit 14, which lowers the 12-volts d-c present at the LED drive signal 31 to a lower level that is applied to the anodes of the LEDs located on the LED display unit 20.

The 12-volts d-c voltage available at the tail light input signal 17 is also applied to the LED control circuit 16. The circuit 16 determines which of the LEDs are to be activated and how bright the LEDs will illuminate. The dual brightness level is required because the DS1 LEDs in the LED display unit 20 must function at two brightness levels. The DS1 LEDs illuminate at a lower brightness level when functioning as the tail light and at a higher brightness level when functioning as the brake light The LED control circuit 16, as shown in FIG. 1, activates the output signals 39, 41 and 43, thereby causing all the red LEDs in DS 1 to illuminate. Additionally, the red sections of the LEDs in both the DS2 and DS3 are also activated, causing all the LEDs in the LED display unit 20 to illuminate. The illumination of all the LEDs occurs when the transistor activation signals 39, 41 and 43 are applied respectively to the base of transistors Q1, Q2 and Q3 which are located in the LED activation circuit 18. Initially the transistors Q1, Q2 and Q3 partially turn-on, thereby allowing current to flow through and allow the LEDs in DS1 to illuminate at an initial low brightness levels. The red section of LEDs DS2 and DS3 will also illuminate at the same low brightness level as the LEDs in DS 1.

The LED control circuit 16 is designed to cause the LEDs in DS1 to illuminate at the two brightness levels. The LEDs illuminate as a lower brightness level when functioning as a tail light and at a brighter level when functioning as the brake light. The LED control circuit 16 supplies the transistor activation signals 39, 41, 43, 37 and 45, causing all red LEDs in DS1 to illuminate along with the three red sections of the LEDs in both DS2 and DS 3.

When the driver of the vehicle 32 applies the vehicle brake pedal, 12-volts d-c appears on the brake input signal 15 that is applied from the vehicle 32. The signal 15 passes through the isolation diode D3 to the brake output signal 25. When the tail lights are already activated, the 12-volts d-c via the tail light output signal 27 passes to the function select signal 29 of the LED drive circuit 14. The additional voltage applied from the brake output signal 25 has no effect on the LED drive circuit 14. However, the voltage from the brake input signal 15 is also applied to the input of the LED control circuit 16 which causes the circuit 16 to increase the drive current on the transistor activation signals 39, 41 and 43. This increase in current is applied to the base of transistors Q1, Q2 and Q3, causing the DS1 LEDs plus the red section of the LEDs in DS2 and DS3 to illuminate at a higher brightness indicating to a driver following the vehicle 32 that the brake has been applied. Applying the brake when the vehicle tail lights are off causes the red LEDs in DS1 and the red LEDs in DS2 and DS3 to also illuminate at full brightness.

When the left turn signal is activated by the vehicle driver, 12-volts d-c is applied to the left turn input signal 11. This is not a constant 12-volts d-c but turns on and off at a preset vehicle blink rate. The 12-volts d-c is applied through isolation diode D1to the left turn output signal 21 and then to the function select signal 29 on the LED drive circuit 14. The 12-volts d-c voltage is also applied through the left turn input signal 11 to the input 11 of the LED control circuit 16. The LED control circuit 16 outputs an LED activation signal 37 that is applied to the base of transistor Q4. This in turn causes transistor Q4 to turn on and off, causing the yellow sections DS2 of the LEDs in the LED display unit 20 to turn on and off at the vehicle's preset blink rate. The LED control circuit 16 does not directly turn the LEDs on and off. This happens because the 12-volts d-c present at the input signal 11 is turning on and off at the vehicle's preset blink rate.

While the invention has been described in detail and pictorially shown in the accompanying drawings it is not to be limited to such details, since many changes and modifications may be made to the invention without departing form the spirit and the scope thereof. Hence, it is described to cover any and all modifications and forms which may come within the language and scope of the claims.

The invention claimed is:

1. A vehicle rear light assembly (VRLA) that functions in combination with a vehicle that includes a left turn switch that produces a left turn input signal (11), a right turn switch that produces a right turn input signal (13), a brake pedal that produces a brake input signal (15), and a tail light switch that produces a tail light input signal (17), said VRLA comprising:

A. a vehicle function select circuit (12) having means for receiving and processing:
  a) the left turn input signal (11) and producing through an isolation diode (D1), a left turn output signal (21),
  b) the right turn input signal (13) and producing through an isolation diode (D2), a right turn output signal (23),
  c) the brake input signal (15) and producing through an isolation diode (D3) a brake output signal (25), and
  d) the tail light input signal (17) and producing through an isolation diode (D4), a tail light output signal (27),
  wherein said vehicle function select circuit (12) produces a single output consisting of a function select signal (29) that corresponds to the particular vehicle function that has been selected, B. an LED drive circuit (14) having means for receiving and processing the function select signal (29) and producing an LED drive signal (31), C. an LED control circuit (16) having means for receiving and processing the left turn input signal (11), the right turn input signal (13), the brake input signal (15) and the tail light input signal (17), wherein said LED control circuit (16) having further means for determining which LEDs are to be activated to produce a red light or a yellow light, wherein the output of said LED control circuit (16) is a first transistor activation signal (37), a second transistor activation signal (39), a third transistor activation signal (41), a fourth transistor activation signal (43) and a fifth transistor activation signal (45), D. an LED activation circuit (18) comprising:
  a) a first transistor (Q1) having a collector, a base connected to the transistor activation signal (39) and an emitter connected to circuit ground,
  b) a second transistor (Q2) having a collector, a base connected to the transistor activation signal (41) and an emitter connected to circuit ground,
  c) a third transistor (Q3) having a collector, a base connected to the transistor activation signal (43) and an emitter connected to circuit ground, d) a fourth transistor (Q4) having a collector, a base connected to the transistor activation signal (37) and an emitter connected to circuit ground,
e) a fifth transistor (Q5) having a collector, a base connected to the transistor activation signal (45) and an emitter connected to circuit ground, and E. an LED display unit (20) which includes a center compartment (22) having a plurality of LEDs, including a first plurality of LEDs (DS1), a left compartment (24) having a second plurality of LEDs (DS2), and a right compartment (26) having a third plurality of LEDs (DS3), wherein the anode of each LED is connected to the LED drive signal (31) applied from said LED drive circuit (14), and the cathodes of the LEDs comprising (DS1) are connected to the collector of transistor (Q2) via an LED activation signal (49), the cathodes of the LEDs comprising (DS2) are connected to the collector of transistor (Q1) via an LED activation signal (51), the cathodes of the LEDs comprising (DS3) are connected to the collector of transistor (Q3) via an LED activation signal (53) and the cathodes of the LEDs comprising (DS3) are connected to the collector of transistor (Q5) via an LED activation signal (55),wherein when a particular vehicle function is selected by a driver of the vehicle, the corresponding signal (11, 13, 15, 17) is processed by said LED control circuit (16) that produces the first transistor activation signal (37), the second transistor activation signal (45), the third transistor activation signal (39), the fourth transistor activation signal (41) and the fifth transistor activation signal (43), wherein these signals are applied through the LED control circuit (18) to the LED display unit (20) which is also applied the LED drive signal (31) from the LED drive circuit (14).

2. The VRLA as specified in claim 1 wherein the plurality of LEDs located on the center compartment of said LED display unit ranges from 7 to 11 LEDs, with 9 LEDs preferred.

3. The VRLA as specified in claim 2 wherein the plurality of LEDs located on the left and right compartment of said LED display unit ranges from 2 to 5 LEDs, with 3 LEDs preferred.

4. The VRLA as specified in claim 3 wherein the plurality of LEDs are electrically connected in a series-parallel configuration.

5. The VRLA as specified in claim 1 wherein said LED display unit is comprised of a hermetically sealed enclosure.

6. The VRLA as specified in claim 5 wherein said LED display unit has a rear section having a reflective inner surface.

7. The VRLA as specified in claim 6 wherein said LED display unit has a structure for being attached to the rear window of a vehicle to allow said LED display unit to be viewed from the rear of the vehicle.

8. The VRLA as specified in claim 1 wherein said LED drive circuit is comprised of a GKL2596 voltage regulator.

9. The VRLA as specified in claim 1 wherein said LED control circuit is comprised of a microcontroller.

* * * * *